April 6, 1948. G. B. THAYER ET AL 2,439,351
PLASTIC TUBE FITTING
Filed Jan. 3, 1944

INVENTORS
Gordon B. Thayer
Robert D. Lowry
BY
Griswold & Burdick
ATTORNEYS

Patented Apr. 6, 1948

2,439,351

UNITED STATES PATENT OFFICE 2,439,351

PLASTIC TUBE FITTING

Gordon B. Thayer, Saginaw, and Robert D. Lowry, Midland, Mich., assignors to The Dow Chemical Company, Midland, Mich., a corporation of Delaware Application January 3, 1944, Serial No. 516,760

2 Claims. (Cl. 285—86)

This invention relates to a plastic fitting useful in connecting flexible plastic tubing.

Due to its unique and valuable properties and to its ready availability, flexible plastic tubing is at present used widely in certain applications to replace tubing made from difficultly obtainable or expensive metals and alloys. Such tubing is prepared easily from plastic materials which have, in many instances, superior resistance as compared with the common metals, to the corrosive action of acids, alkalies, and certain salt solutions. The flexibility of such tubing, particularly in sizes up to about one inch in diameter, offers considerable advantage in ease of installation over more rigid and substantially inflexible metal pipe. One difficulty encountered in the assembling and use of systems of flexible plastic tubing has been that of successfully connecting lengths or sections of the tubing together or to other structures, such as tanks or containers, to produce a leak-proof joint. The use of flange unions to join sections of plastic tubing of diameter less than about one inch is undesirable because the flanges are disproportionately heavy and cumbersome to assemble and install and consume undesirably large amounts of material. The use of metallic fittings, such as connectors, unions, elbows and T's, of a type similar to that known as the flared type S. A. E. standard brass fuel and oil tube fitting and having a beveled seat in the tube nut, or female, part and a corresponding beveled surface on the union, or male, part of the fitting between which the flared end of the tube is clamped, is undesirable because of the introduction of metallic surfaces into the system, thus off-setting a number of the advantages inherent in the plastic substance.

Attempts have been made to use flared type fittings fabricated from plastic substances and thus to avoid the introduction of metal surfaces into the system but without substantial success. The term "flared type fitting" is used herein to designate a fitting wherein a flared end of the tube which it is desired to connect is clamped between beveled surfaces of two members of the fitting which are usually threaded so that they may be screwed firmly together. By way of convenience the beveled surface of the internally threaded, or female, member, herein referred to as the "tube nut," is designated as the "seat" and the beveled surface of the externally threaded, or male, member, herein referred to as the "union," is designated as the "land." In such heretofore known flared type fittings constructed from either a metal or a plastic it has been the practice to form the separate members of the fitting so that the land and the seat are inclined at the same angle, usually at an angle of 45°, to the longitudinal axis of the fitting, i. e. to the line of flow of a fluid passing through the fitting in the region of the joint. Considerable distortion of the members of such plastic fitting occurs during tightening of the connection thus throwing the parallel beveled surfaces of the tube nut and union out of alignment and causing the joint to leak. If too much stress is applied in tightening the connection, breakage of the fitting or stripping of the threads is likely to occur. Furthermore, under internal fluid stress occurring during normal usage of the system, slippage of the flared ends of the tubing within the fitting assemblage frequently occurs thus causing the joint to leak. Sometimes the tubing is pulled entirely out of the end of the fitting. These difficulties are particularly apparent when the fittings are fabricated from thermoplastic substances which are usually considerably more flexible and more easily deformed than are the usual thermosetting substances. It is apparent that the light weight and simplicity of fabrication and installation of such all-plastic fittings, and particularly of thermoplastic fittings, would render them of great value if they could be relied upon to produce leak-proof joints which would not loosen or leak upon continued usage under the working conditions to which the plastic tubing itself is usually subjected.

It is, therefore, an object of the present invention to provide an improved plastic fitting for connecting flexible plastic tubing.

An additional object is to provide a thermoplastic fitting for connecting flexible plastic tubing which may be installed readily in flexible plastic piping systems and which is not subject to leakage under the ordinary conditions of usage of the plastic tubing.

An additional object is to provide an all-plastic, substantially leak-proof connection between lengths of flexible plastic tubing.

An additional object is to provide a flared type thermoplastic fitting for connecting flexible plastic tubing which may be tightened securely without the application of undue stress and which is not subject to leakage under continued usage.

These and related objects are accomplished readily by forming a thermoplastic flared type fitting wherein the land and the seat diverge at a small angle outwardly from the center of the fitting. When a flexible plastic tube is flared and inserted into such a thermoplastic fitting and the fitting tightened, the stress exerted on the plastic members of the fitting deforms them sufficiently to bring the two diverging beveled surfaces into substantially parallel alignment. Uniform distribution of pressure over the flared portion of the tubing is thus obtained. Also, undue stress is not necessary to tighten the fitting and the internal fluid pressure necessary to cause leakage of fluid through the joint or slippage of the tubing within the fitting is much greater than that causing leakage or slippage when the two beveled surfaces are formed originally at the same angle with respect to the longitudinal axis of the fitting and are thus invariably thrown out of alignment when the fitting is tightened. Additionally, the loosening of the joint with usage is largely overcome by the tendency of the deformed members to spring back into their original shape, thus maintaining additional tension on the flared tubing. As an additional precaution to prevent slippage of the tubing, the beveled end of one of the members, usually of the union member, is preferably formed with a serrated surface thereby increasing its frictional contact with the surface of the tubing.

Reference is made to the accompanying drawing in which, in the interest of clarity, certain features are shown on a somewhat exaggerated scale and wherein.

Figure 1:
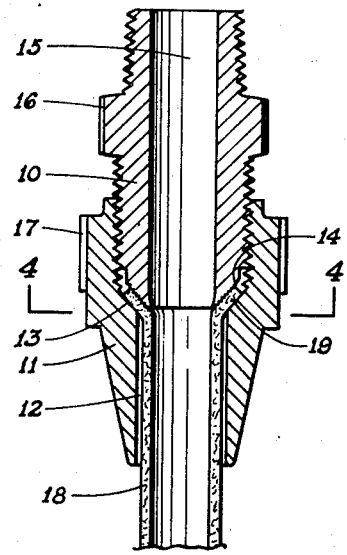
Fig. 1 is a longitudinal view in cross-section of a thermoplastic fitting for connecting a flexible plastic tube and showing a section of a flexible plastic tube assembled in the fitting.

The thermoplastic fitting of Fig. 1 consists of an externally threaded male, or union, member 10 and an internally and correspondingly threaded female member, or tube nut, 11. The tube nut has a central bore 12 large enough to permit passage therethrough of the particular flexible plastic tubing with which the fitting is designed to be used, it being understood, however, that the fitting may, if desired, be used with tubing having an external diameter considerably smaller than the diameter of the bore of the tube nut. The portion of the bore of the tube nut which is threaded has a somewhat larger diameter than the unthreaded portion to accommodate the union when the fitting is assembled. A beveled seat 13 is provided in the wall of the bore of the tube nut intermediate between the narrow and the threaded portions.

One end of the union member 10 is threaded externally to match the threads of the tube nut so that the two may be screwed together as shown. A beveled surface, or land, 14 is provided on the threaded end of the union to correspond with the seat of the tube nut although, as hereinafter explained, the land and the seat are not formed at the same angle. The union is also provided with a central bore 15 to permit the passage of fluid therethrough. The end of the union opposite the threaded and beveled end just described may be threaded and beveled similarly to fit a second tube nut and the fitting thus adapted to the joining of two sections of tubing, or it may be adapted in any other way to connect in desired fashion with any plastic or metal structure to which it is desired to join the flexible plastic tubing. The outer surfaces of either or both the union and the tube nut may, if desired, be faced, as shown at 16 and 17, respectively, throughout a portion of their lengths to permit the use of wrenches in tightening or loosening the fitting. It is obvious that either member may be modified so as to produce L's, T's and connectors generally.

Figure 2:
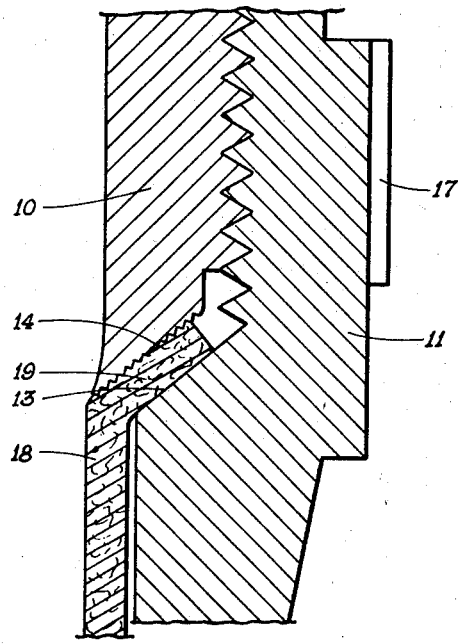
Fig. 2 is an enlargement of a portion of Fig. 1.
Figure 3:
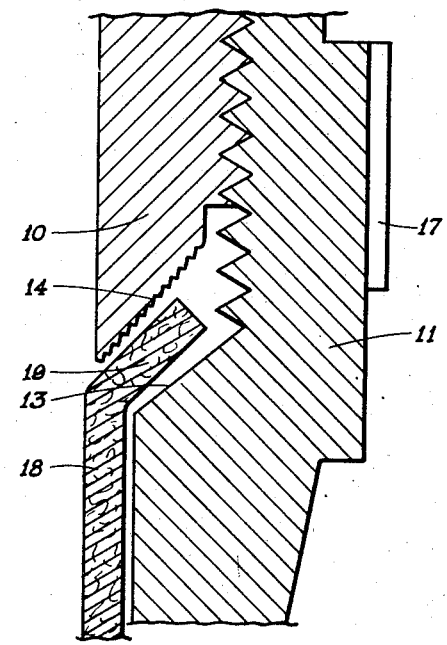
Fig. 3 is the same as Fig. 2 showing the fitting and tube after assembly but before tightening of the connection.

In forming the connection, the tube nut 11 is slipped over the end of a flexible plastic tube 18 and the end of the latter is then flared, as with a flaring tool, as is shown at 19 of Figs. 2 and 3. The tube nut is then slipped along the tube until the flared end 19 rests on the seat 13 and the union member is screwed firmly into the tube nut and the fitting tightened, preferably with the aid of a torque wrench.

It has been stated that the land 14 on the end of the union member 10 is not formed at the same angle as the seat 13 in the tube nut 11. This is clearly apparent from Fig. 3 wherein is shown an enlargement of a cross-section of one side of the joint of Fig. 1 just prior to finally tightening the fitting. Whereas, in the metal and plastic fittings of the prior art the seat and land of the tube nut and of the union member respectively have invariably been formed at the same angle with respect to the longitudinal axis of the fitting, the fitting of the present invention is characterized by the fact that the land and the seat diverge from the center outwardly at an angle of from about 2° to about 15°. This angle may be designated conveniently as the "angle of divergence." When the fitting is tightened, the tapered end of the union member 10 is deformed slightly by the stress exerted upon it as, doubtless, is also, but to a much lesser extent, the seat in the tube nut, and the land 14 and the seat 13 assume positions in the tightened connection substantially parallel to each other as is illustrated clearly in Fig. 2. Uniform pressure is thus exerted over the area of the flared end 19 of the plastic tube 18 and the maximum resistance of the joint to leakage or slippage of the tube within the fitting is realized.

The angles at which the seat 13 and the land 14 are formed with respect to the longitudinal axis of the fitting may vary from about 30° to about 60°. Generally speaking, when the seat angle is relatively small, e. g. in the neighborhood of 30° to 35°, the angle of divergence will be small, e. g. from 2° to 10°. When the seat angle is relatively large, e. g. in the neighborhood of 50° to 60°, the angle of divergence may be somewhat greater, e. g. from 8° to 15°. The angle of divergence will also depend to some extent upon the stiffness or rigidity of the fitting members and particularly of the union member, it being smaller when the members are more rigid and, conversely, larger when the members are less rigid. Such rigidity depends, in turn upon the design of the fitting, e. g. the amount of plastic material employed to stiffen the members, and upon the physical characteristics of the plastic substance itself.

Figure 4:
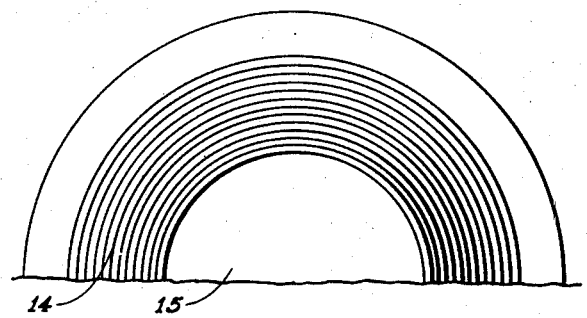
Fig. 4 is an end view of a portion of the union member of a thermoplastic fitting taken along the line 4—4 of Fig. 1.

If desired, serrations may be formed in the surface of either the land 14 or the seat 13, such serrations being clearly evident in Figs. 2, 3, and 4. Serrations in both the land and the seat are unadvisable since under such conditions the tubing is liable to be torn when the fitting is tightened. The serrations are preferably formed in whichever of the beveled surfaces will not rotate with respect to the tubing when the fitting is tightened. The annular nature of a preferred form of such serrations is apparent from Fig. 4. By providing one serrated surface better resistance to slippage is obtained than when both surfaces are smooth and by providing the serrations in annular form there is no possibility of fluid leaking between the serrations. The annular serrations are preferably from 0.005 to 0.020 inch deep and as close together as they may be formed conveniently.

It should also be pointed out that the tube nut and the union need not necessarily be made from the same plastic substance. Although it is, of course, desirable that the union have certain of the desirable properties, such as resistance to solvents, etc., possessed by the plastic tubing which it is desired to connect, it is apparent that, since the fluid inside the tube does not come in contact with the tube nut, the latter may be constructed from a substance which is not necessarily resistant to the fluid. The fitting may thus be stiffened considerably by a proper choice of plastic from which to fabricate the tube nut. In some instances the tube nut may, if desired, be made of metal.

In a comparative determination, a connector having the dimensions of a ¾ inch flared type S. A. E. standard brass fuel and oil connector, as described in the 1940 S. A. E. Handbook of Standards, but having somewhat thicker walls, was injection molded from a thermoplastic composition consisting of a copolymer of about 92 per cent by weight of vinylidene chloride with about 8 per cent of vinyl chloride plasticized with about 10 per cent of di-alphaphenylethyl ether. The beveled land on the end of the union member and the seat in the tube nut were each formed at an angle of 45° with the longitudinal axis of the fitting. This fitting was designated as type A. A similar fitting designated as type B, was molded from the same plastic composition and with the same dimensions as the type A fitting except that the land was formed at an angle of 40° and the seat at an angle of 50° with the longitudinal axis of the fitting thus providing an angle of divergence between the land and the seat of 10°. The land was also formed with 48 annular grooves per radial inch, each groove being 0.01 inch deep.

Sections of ¾ inch flexible tubing molded from the same copolymer plasticized with 7 per cent of its weight of di-alphaphenylethyl ether, and having a wall thickness of 0.062 inch, were flared at the end and a section was assembled with each of the type A and type B fittings using a setting torque of about 95 inch pounds. A number of each type of joint were tested hydrostatically for minimum leaking pressure and the average values taken in each case. Joints made using type A fittings leaked at an average hydrostatic pressure of 560 pounds per square inch while none of the joints made using the type B fittings had leaked when the tubing burst at an average pressure of 692 pounds per square inch.

Tests were made of the holding power of the joints made with the two types of fittings by determining the tension necessary to pull the flared end out of the tightened fitting. A setting torque of 95 inch pounds was used to tighten the fitting in each case. The tubing pulled out of the type A fittings at an average tension of 232 pounds and out of the type B fittings at an average tension of 328 pounds. Joints made with the type B fittings thus had an average minimum leaking pressure more than 24 per cent greater and required 41 per cent more tension to pull the tubing out of the fitting than did the type A fitting. Joints made with the type B fittings were also much more resistant to leakage and slippage of the tubing within the fitting under severe water-hammer conditions than were joints made with the type A fitting.

Although the fitting of the invention has, for the sake of convenience, been described as having the land-bearing member threaded externally and the seat-bearing member threaded internally, it is obvious that this order may, if desired, be reversed without detracting from the effectiveness of the joint formed by the fitting.

We claim:

1. A plastic fitting for flexible plastic tubing, comprising: centrally bored threaded male and female plastic members having cooperating right frustro-conical surfaces around the bore adapted to grip the flared end of a flexible plastic tube when the members are screwed together, the vertical angle between the generatrix of the conical surface and the axis of the male member being 2° to 15° more acute than that of the female member, when said members are not tightly screwed together; the frusto-conical tip of the male member being yieldable, under normal coupling stresses, to assume a position parallel to the cooperating surface of the female member.

2. A plastic fitting for connecting flexible plastic tubing, comprising: a centrally bored, internally threaded plastic female member having a right frusto-conical seat therein, said bore being adapted to receive a flexible plastic tube and said seat being adapted to receive a flared end of said plastic tube; and a corresponding centrally bored, externally threaded plastic male member having a right frusto-conical land on the end thereof adapted to engage the internal wall of the flared end of the plastic tube and to hold said end on the said seat, the vertical angle between the generatrix of the conical surface and the axis of the land being from 2° to 15° more acute than that of the seat, the land and seat diverging from one another to that extent outwardly from the axis of the fitting when not tightly screwed into engagement with the flared end of the plastic tube; the land portion of the male member being yieldable, under normal coupling stresses, to assume a position parallel to the seat on the female member and to press evenly on the confined portion of the flared plastic tube.

GORDON B. THAYER.
ROBERT D. LOWRY.

REFERENCES CITED

The following references are of record in the file of this patent:

UNITED STATES PATENTS

| Number | Name | Date |
| --- | --- | --- |
| 1,326,970 | Row et al. | Jan. 6, 1920 |
| 2,189,566 | Kreidel | Feb. 6, 1940 |

FOREIGN PATENTS

| Number | Country | Date |
| --- | --- | --- |
| 525,241 | Great Britain | Aug. 23, 1940 |
| 648,170 | France | Aug. 7, 1928 |
| 791,307 | France | Sept. 23, 1935 |